US008265544B1

(12) United States Patent
Dungy

(10) Patent No.: US 8,265,544 B1
(45) Date of Patent: Sep. 11, 2012

(54) EDUCATIONAL VOTING GAME

(76) Inventor: Anwar Dungy, Plymouth, MI (US)

( * ) Notice: Subject to any disclaimer, the term of this patent is extended or adjusted under 35 U.S.C. 154(b) by 342 days.

(21) Appl. No.: 12/772,221

(22) Filed: May 2, 2010

(51) Int. Cl.
*G09B 7/00* (2006.01)
*G09B 9/00* (2006.01)

(52) U.S. Cl. ........................ 434/362; 434/306

(58) Field of Classification Search .................. 434/306, 434/362
See application file for complete search history.

(56) References Cited

U.S. PATENT DOCUMENTS

| | | |
|---|---|---|
| 4,118,036 A | 10/1978 | Marse |
| 4,216,967 A | 8/1980 | Marse |
| 4,299,390 A | 11/1981 | Delgado |
| 5,190,293 A | 3/1993 | Cabrera |
| 5,288,076 A | 2/1994 | Jackson et al. |
| 5,374,066 A | 12/1994 | Ali |
| 5,624,120 A | 4/1997 | Frank-Opigo |
| 2003/0034607 A1 | 2/2003 | Portela |
| 2004/0117244 A1 | 6/2004 | Scott |
| 2004/0169333 A1 | 9/2004 | Wolkis et al. |
| 2009/0186679 A1 | 7/2009 | Irvine et al. |

OTHER PUBLICATIONS

"Dungeons & Dragons Online", website: http://www.ddo.com/playnow/; 1 page; printed Jan. 13, 2010.
"Election Day", website: http://www.election-day.info/; 2 pages; printed Jan. 13, 2010.
"eLections Description", website: http://compsimgames.about.com/od/downloadfreegames/p/elections.htm; 2 pages; printed Jan. 14, 2010.
"eLections Game", website: http://compsimgames.about.com/od/downloadfreegames/p/elections.htm; 2 pages; printed Jan. 13, 2010.
"Pick Your President", website: http://projects.washingtonpost.com/2008/pick-your-president/; 1 page; printed Jan. 13, 2010.
"President Forever Game", website: http://www.theoryspark.com/political_games/president_forever/info/index.htm?gclid=CK6...; 5 pages; printed Jan. 13, 2010.

*Primary Examiner* — Xuan Thai
*Assistant Examiner* — Evan Page
(74) *Attorney, Agent, or Firm* — Christopher Wood; Premier Law Group, PLLC

(57) ABSTRACT

An online voting game that teaches the participants the mechanics behind running for office. Registered users can run for office or participate as a voter or do neither and, for example, observe the results as they roll in. Registered users that run for office are required to comply with a set of predetermined rules. Voting at state and city level is performed based on each voter's recorded residence (e.g., city and state); users can run in national elections such as running for President so long as they satisfy the age, residency and citizenship requirements to run for President. In one embodiment, registered users running for office provide photographs and video clips that disclose their views on political issues of the day.

4 Claims, 12 Drawing Sheets

Fig. 9

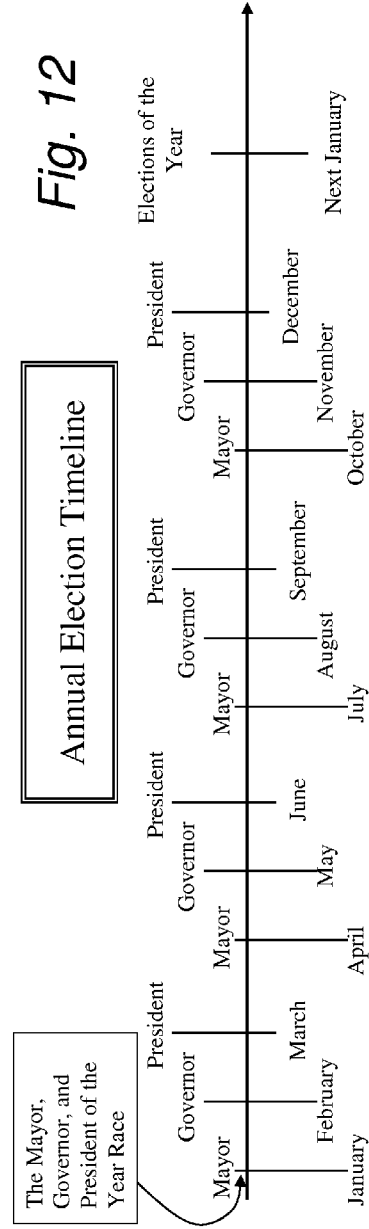

EDUCATIONAL VOTING GAME

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to voting systems for use in an educational environment. More specifically, the invention is a voting game that teaches the participants the mechanics behind running for office.

BACKGROUND OF THE INVENTION

Election campaign games in the form of board games are known such as that described in U.S. Pat. No. 5,624,120. While such games offer entertainment and are of educational value they are generally played by just a few players located in close proximity to the board and with typically less than 10 players.

There is a need for a voting campaign game that can be played by more players and which offers an interactive approach and can be played by players largely irrespective of their location.

SUMMARY OF THE INVENTION

An online voting game that teaches the participants the mechanics behind running for office. Registered users can run for office or participate as a voter or do neither and, for example, observe the results as they roll in. Registered users that run for office are required to comply with a set of predetermined rules. Voting at state and city level is performed based on each voter's recorded residence (e.g., city and state); users can run in national elections such as running for President so long as they satisfy the age, residency and citizenship requirements to run for President. In one embodiment, registered users running for office provide photographs and video clips. The candidates typically record on the video clips who they are and why voters should vote for them. The video clips can also be used by candidates to disclose their views on political issues of the day.

BRIEF DESCRIPTION OF THE DRAWINGS

FIG. 9 shows a webpage according to the present invention.

FIG. 12 shows a webpage according to the present invention.

Similar reference characters denote corresponding features consistently throughout the attached drawings.

DETAILED DESCRIPTION

The present invention is directed to voting systems for use in an educational environment. More specifically, the invention is a voting game 140 that teaches the participants the mechanics behind running for office. The voting game 140 can be placed on any suitable server setup such as that shown in FIG. 11.

The terms "World Wide Web" and "world-wide-web" are hereinafter regarded as equivalent terms. The world-wide-web can be abbreviated as WWW or www and commonly known as "the web", is a system of interlinked hypertext documents contained on the Internet. With a web browser, one can view web pages that may contain text, images, videos, and other multimedia and navigate between them by using hyperlinks. The terms "registrant" and "registered user" are hereinafter regarded as equivalent terms. The terms "educational voting game 140", "voting game 140", and "game 140" are hereinafter regarded as equivalent terms.

Figure 1:
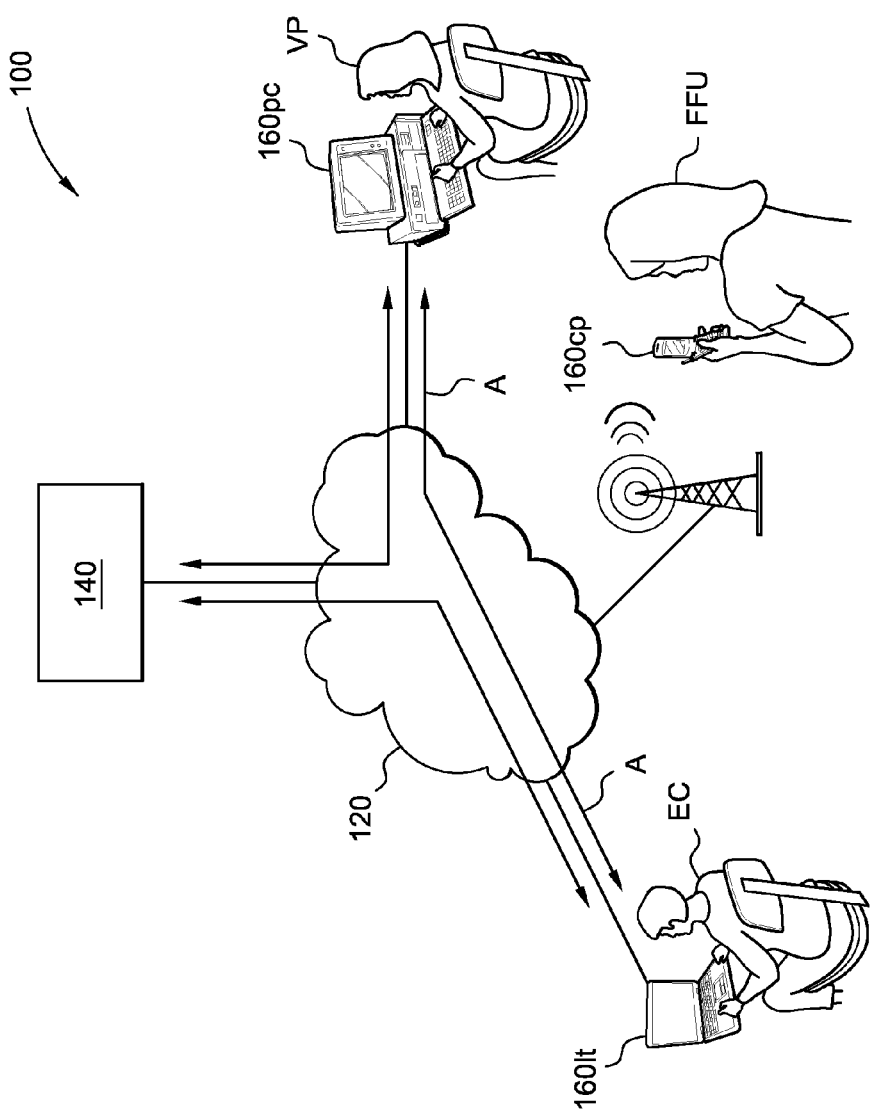
FIG. 1 illustrates an embodiment of a system 100 for operating an educational voting game 140 according to the invention.

FIG. 1 illustrates an embodiment of a system 100 for operating an educational voting game 140 according to the invention. The system 100 includes a network 120 providing communication between an educational voting game 140 and one or more remote units 160 being operated by one or more election candidates EC and one or more voting participants VP. In FIG. 1 the remote units 160 are represented by a personal computer 160*pc*, a cell phone 160*cp*, and a laptop 160*lt*.

The educational voting game 140 can be run on one or more servers for communicating with the remote units 160. The processing units include electronics for performing the methods and functions described in this application. Suitable remote units 160 include, but are not limited to, desktop personal computer, workstation, telephone, cellular telephone, personal digital assistant (PDA), laptop, or any other device capable of interfacing with a communications network. Suitable networks 120 for communication between the server and the remote units 160 include, but are not limited to, the Internet, an intranet, an extranet, a virtual private network (VPN) and non-TCP/IP based networks. The processing unit can be a server in the form of a computer system 1000 such as that shown in FIG. 11.

Still referring to FIG. 1, a user can communicate with the educational voting game 140 via a remote unit such as a laptop 160*lt* or a personal computer 160*pc*. Examples of communications include exchange of electronic mail, web pages and answers to inquiries on web pages. The educational voting game 140 can modify the communication from one user to another user. For instance, the educational voting game 140 can change the user's real name on an email to an anonymous name so the user's identity is protected; users replying to another user's email can likewise be protected by the game 140 wherein the replying email's user ID is modified to an anonymous name.

It should be understood that the educational voting game 140 envisages users including (1) users running for virtual office (election candidates EC), (2) users that want to vote (voting participants VP), and optionally (3) users that are happy to just observe or spend time in the game 140 without voting or running for election (for convenience such users are designated as free floating users FFU).

Figure 2:
FIG. 2 shows a webpage according to the present invention.

Each prospective user can sign up and upload personal information to join the game 140 by means of any suitable web page provided by the game 140. For example, FIG. 2 shows a sign up web page 162. For illustration purposes only, a user named John Doe has entered his name on a first row of fields at 164, his email address at 166 and a password at 168.

The game 140 can enable one user to communicate directly with another user as shown by the arrow labeled A in FIG. 1. This direct communication can occur after the users exchange email addresses or phone numbers during a communication through the educational voting game 140 without either user revealing their true identity. Alternatively, one user can request that the educational voting game 140 provide another user with his/her direct communication information, e.g. e-mail address.

Figure 3:
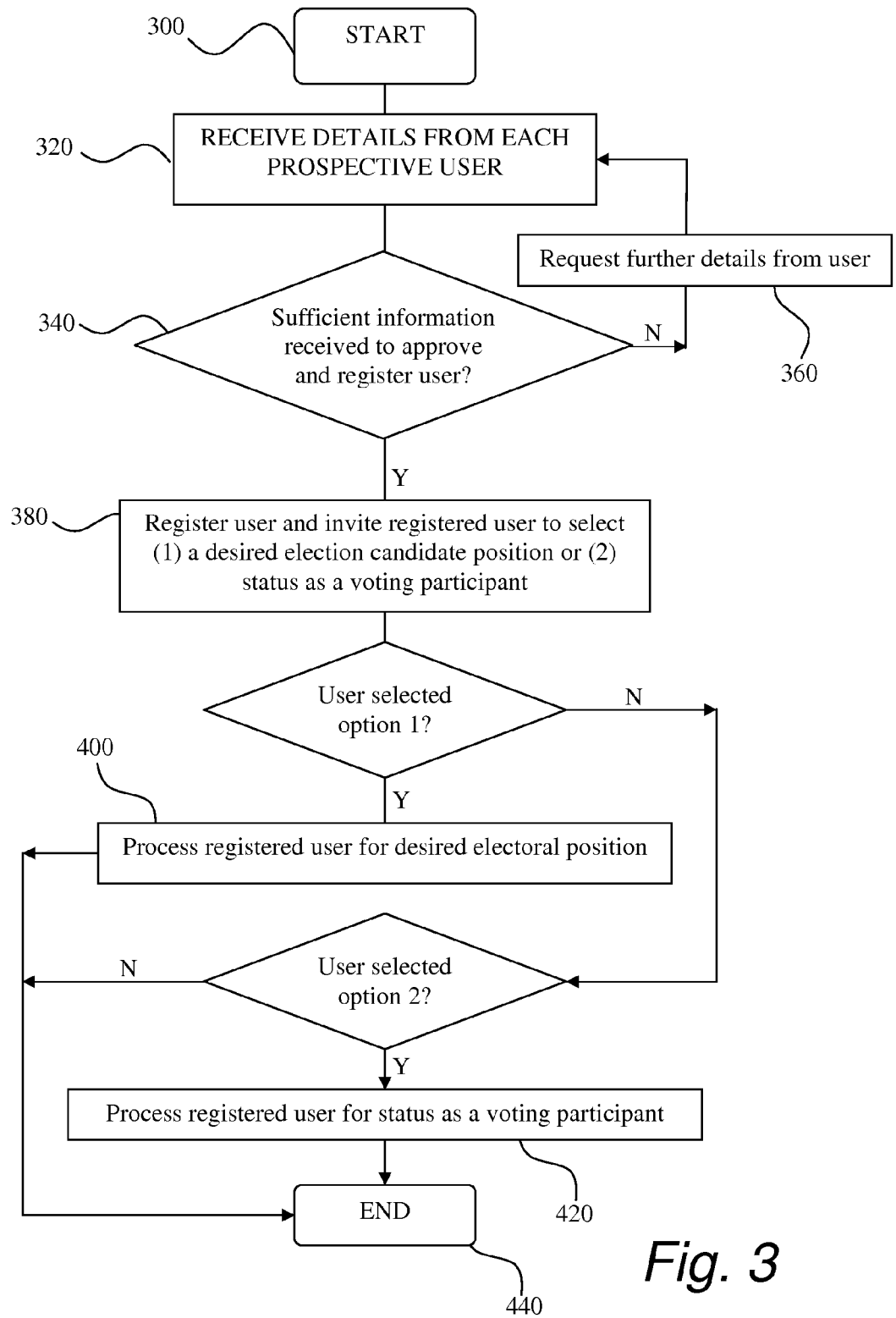
FIG. 3 shows a flowchart according to the present invention.

FIG. 3 illustrates an embodiment of the educational voting game 140 for processing prospective users. The embodiment begins at start block 300. At process block 320, the educational voting game 140 receive details from a prospective user. Examples of user details include name, age, and location of the prospective user (e.g., city, state, zip code). The prospective user preferably supplies their city (if applicable), state of residence (e.g., Illinois, Michigan, California, West Virginia, Virginia, and North Dakota etc) and optionally a zip code. The letters "Y" and "N" are abbreviations for Yes and No, respectively. The terms "determination block" and "conditional block" are hereinafter regarded as equivalent terms.

Figure 7:
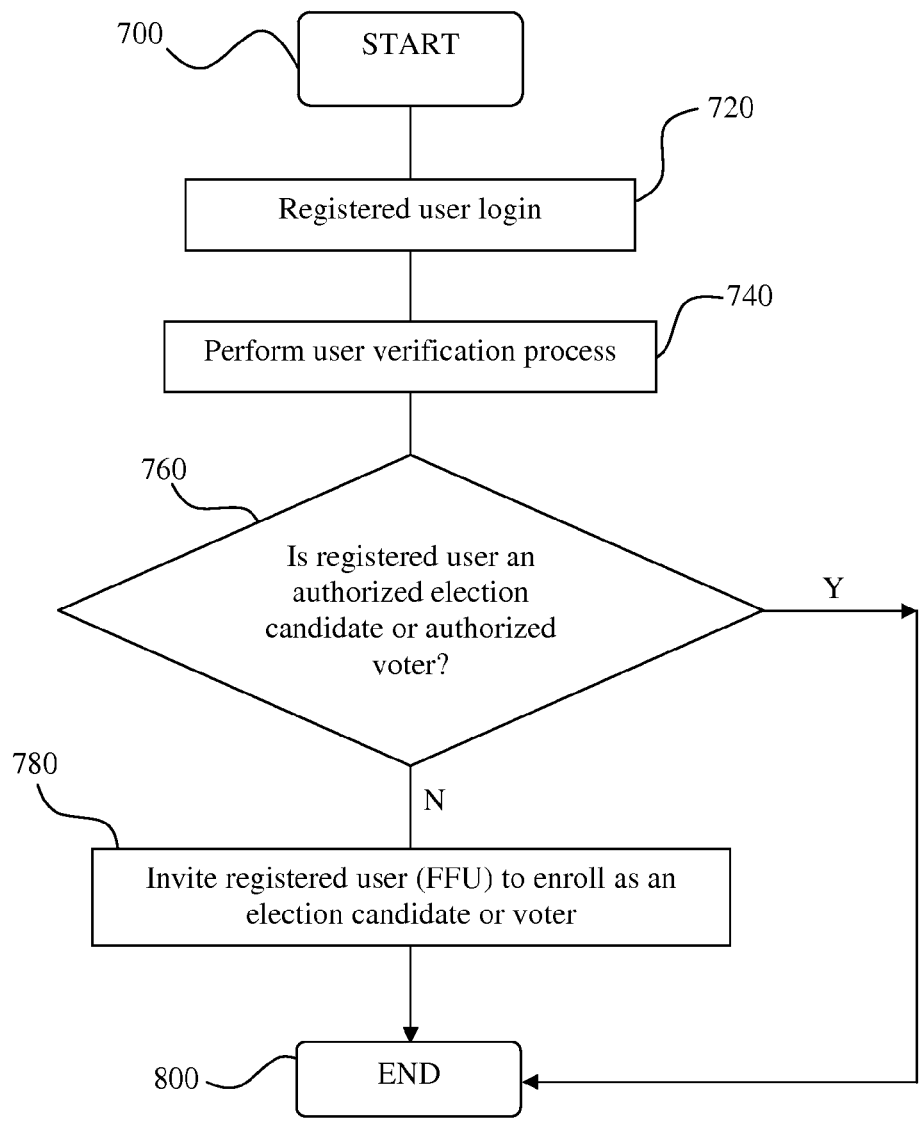
FIG. 7 shows a flowchart according to the present invention.

Still referring to FIG. 3, at conditional block 340, a determination is made whether the educational voting game 140 has received sufficient information to approve and register the user. When the determination is negative process block 360 is accessed and the prospective user invited to provide missing details. When the determination is positive, process block 380 is accessed and the user registered and invited to enroll for (1) a desired election candidate position or (2) to become a voter. In addition, though not specifically mentioned in process block 380 the educational voting game 140 can request a photo of the registered user for use in the game 140. If the user selects option 1 at 380 the user is assigned the status of election candidate and processed at 400. Alternatively, if the user selects option 2 the registered user is assigned the status of voter participant and processed as such at 420. If the registered user decides not to be an election candidate EC or voter VP then by default the registered user remains a user, but unable to vote or run in an election within the game 140 and, as such, is designated by the game 140 as free floating users FFU. Free floating users FFU can change their status on subsequent logins as depicted in FIG. 7 at 780. With respect to FIG. 3, the embodiment terminates at end block 440. Though not explicitly shown in FIG. 3, registered users can receive confirmation of their registration by e-mail.

The educational election game 140 does not generally allow a registered user the freedom of entering any election race within the election game 140. For example, election candidates can only campaign for mayor or governor in their registered city or state.

In a preferred embodiment, users that register to vote or run in an election campaign and who reside outside of a major city that wishes to vote or campaign must register in that major city's community. In an alternative embodiment the term "city" is broadly interpreted so that election candidates who don't live in cities can run for mayor in their local town or municipality (e.g., the town the user entered as their home town at block 320 in FIG. 3).

In one optional embodiment, successful election candidates must choose to campaign for the next highest office, and if a successful candidate cannot or chooses not to campaign for the next highest office, their position is forfeited to the runner up of the election they won. Elections are won by the election candidate with the most votes cast in his/her favor.

In one embodiment a registered user can change their location at will. However, if the registered user is currently running as an election candidate EC, and the user wants to change their location, as recorded in the game 140, then the user must withdraw from the election he/she is running in prior to changing their location.

Figure 5:
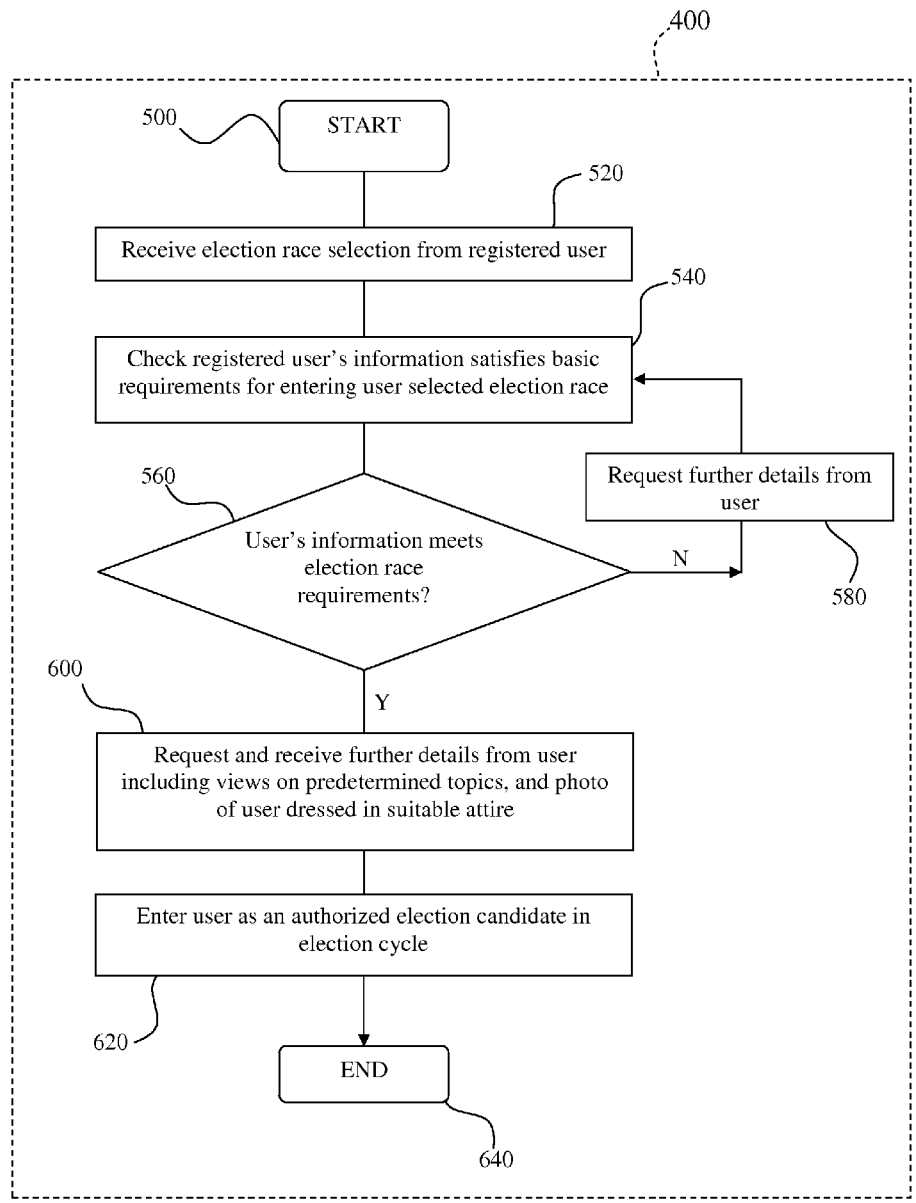
FIG. 5 shows a flowchart according to the present invention.

FIG. 5 shows examples of the kind of steps involved in registering a user for a desired election candidate EC position. This embodiment starts at block 500; at block 520 the user selects an election race of interest to the user. Checks are then made at 540 to determine if the user's information satisfies the basic requirements for entering the user's choice of election race. This information is typically received by the game 140 at blocks 320, 340 and 360 as shown in FIG. 3. Information considered pertinent includes residence (city and state) and citizenship. For example, to run for Mayor of Chicago requires residence in the city of Chicago and U.S. citizenship. At block 560 the user's information is checked against the basic requirements for entering the desired election race. When the determination is negative process block 580 is accessed and the user is invited to provide further details at block 580. When the determination is positive, process block 600 is accessed and the user is invited to provide further details beyond the basic requirements such as the user's photo dressed in suitable attire befitting the election position sought by the user (now classified as an election candidate EC by game 140). Examples of further non-limiting inputs required by the game 140 include a picture or photograph of the election candidate EC either dressed in suitable attire or provided by selecting choices of clothing, and a video clip in which the election candidate EC offers reasons why he/she should be voted into office. The election candidate EC is entered into the election cycle at 620. This embodiment of the invention terminates at block 640. In a preferred embodiment, once a candidate has submitted their video expressing their views on subjects, they may not altar their views on any topic until the next election cycle.

Figure 4:
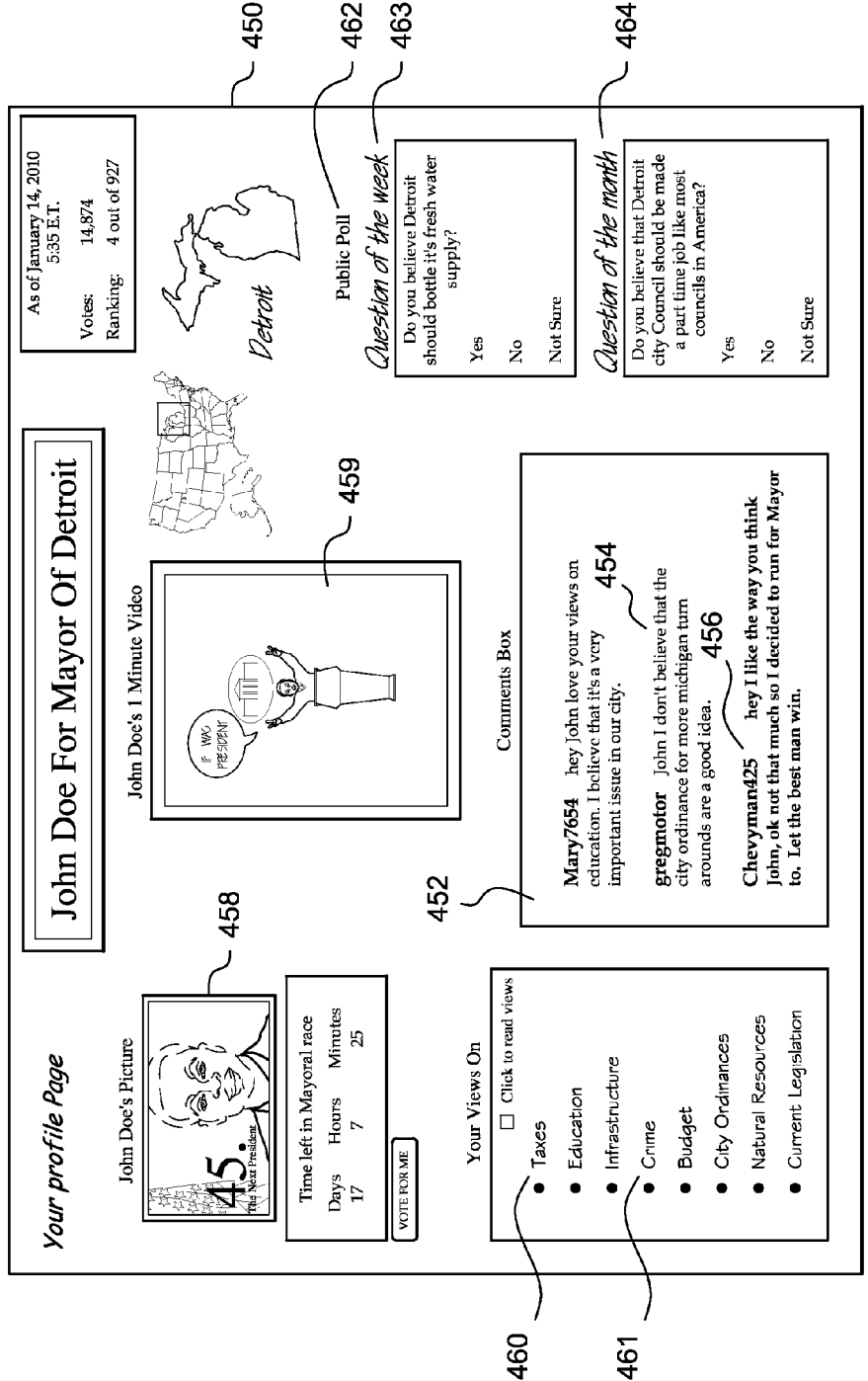
FIG. 4 shows a webpage according to the present invention.
Figure 6:
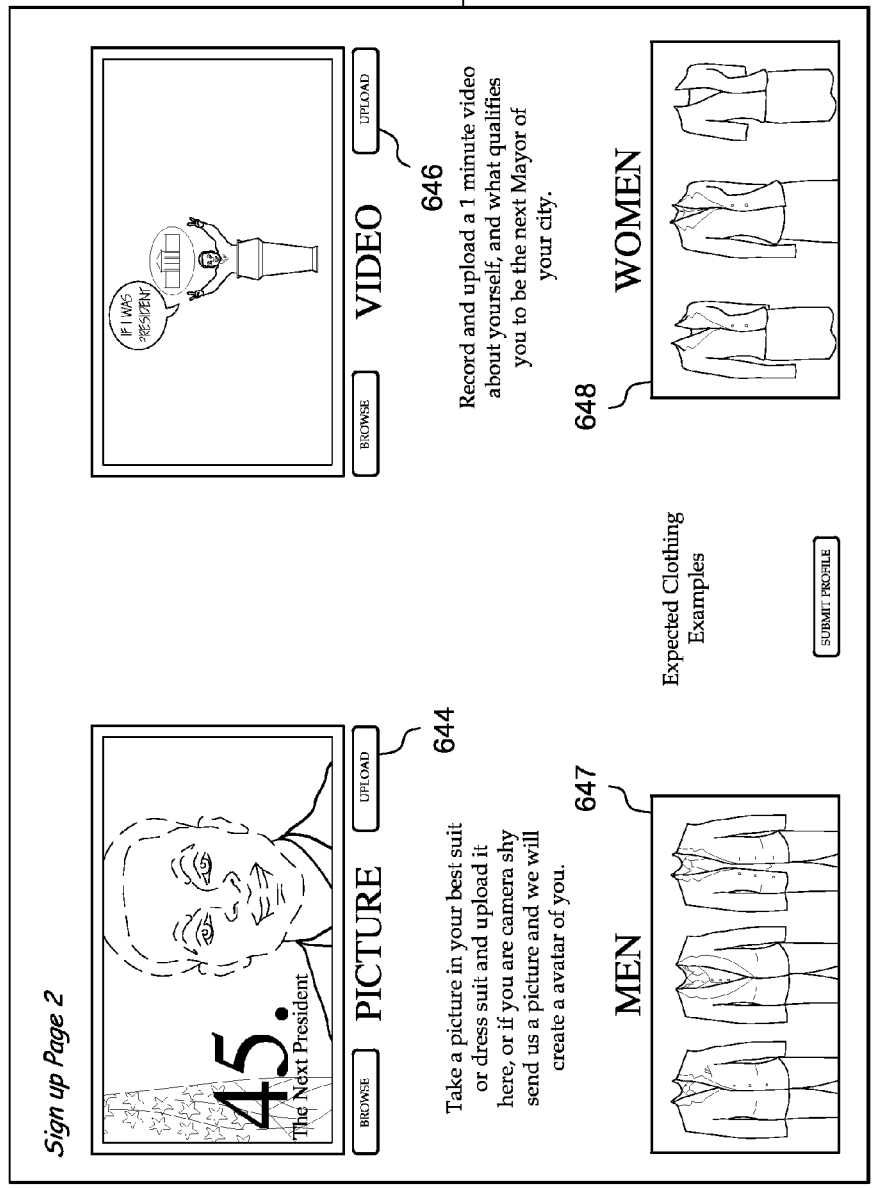
FIG. 6 shows a webpage according to the present invention.

With respect to block 600 in FIG. 5 users can, for example, upload photos by accessing a web page; a non-limiting exemplar web page 642 is shown in FIG. 6. More specifically, registered users wanting to enter an election race can point and click on the web page 642 to upload (to the game 140) a photograph of themselves at 644, a video clip at 646, and optionally select clothing at 647 or 648 to allow the game 140 to construct an image of the user for other users to view when logged into the game 140. Upon receiving a photograph of the user, the corresponding user can check that his or her photograph has been received by the game 140, for example, by viewing a web page 450 at 458 (FIG. 4). While block 600 specifically applies to users registered as election candidates EC, voting participants VP can optionally upload a photograph of themselves at 644 and optionally select clothing at 647 or 648 as appropriate (see FIG. 6).

In one embodiment the educational voting game 140 requires that each prospective user enter accurate information such as the prospective user's real name and location. In the alternative, each user can sign up to the game 140 using a fictitious made-up user-name, and can enter a city and state in which they do not reside. Such arrangements help facilitate anonymity and help prevent ID theft. If the prospective user enters a name already in use they may be invited to enter an alternative spelling or modified name or a handle of their choosing. For example, FIG. 4 shows a web page 450 which displays modified and made-up user names such as, but not limited to, "gregmotor" at 452, and "Chevyman425" at 456. If a user enters "Mary" but a Mary is already registered as a user in the game 140 then the user can enter a modified form of "Mary" such as "Mary7654" as used in FIG. 4. Alternatively prospective users can be allowed to keep a name even if it is already in use in the educational voting game 140 in which case the user's name is associated with a unique string such as, but not limited to, a unique user entered password thereby differentiating the user's name from that of another user using the same name.

Once an election candidate EC selects an election race, the game 140 synthesizes one or more web pages dedicated to providing information about each election candidate EC. For example, web page 450 (see FIG. 4) provides a summary of a John Doe's status. More specifically, web page 450 speaks to a John Doe who has been processed by the game 140 as an election candidate running for Mayor of Detroit. The web page 450 is available for all users to view. The web page 450 shows, for example, that John Doe has uploaded a 1 minute video clip to the game 140 which is downloadable for viewing by, for example, voting participants VP, other election candidates EC, and free-floating users FFU. A user merely clicks on the web page 450 at 459 do download and view John Doe's 1 minute video clip. Likewise, users can view John Doe's views on specific topics by clicking on, for example, taxes at 460 or crime at 461. John Doe (i.e., election candidates in general) can upload their views in video and/or text form on topics such as taxes, education, infrastructure and crime to enable other users to click on, e.g., crime at 461 to upload Joe Doe's views on crime in text and/or video format.

In the alternative, free floating users FFU may or may not be permitted to view election candidate web pages. Restricting free floating users FFU from viewing election candidate web pages could encourage some to become an election candidate EC or a voting participant VP.

A public poll can be run for users. For example, there can be a question of the day, week or month. In FIG. 4 a public poll is shown at 462 made up of a "Question for the week" at 463 and a "Question of the month" at 464. The number of votes can be displayed either immediately on the web page 450 or displayed in a separate web page or window (not shown). In one option, a Question of the day" is also posted to web page 450.

In one embodiment whenever a registered user logs into the game 140 a check is run to verify that the user is listed as such in the game 140 and further checks if the user is an election candidate EC or voting participant VP. If the user is neither an EC or VP the game 140 invites the user to select an election to run in or vote in (i.e., become an EC or VP). An example of this embodiment is depicted in FIG. 7, which begins with start block 700. A user logins at 720 and the game 140 runs a user verification process at 740 to check if the user attempting an login is a genuine registered user of the game and upon verification the game checks if the registered user is running in an election either as a candidate for election or is a voter at 760. If the user is a candidate or a voter the verification ends at end block 800 otherwise the user is regarded as a free floating users FFU and is invited at block 780 to enroll as a candidate or register as a voter.

The game 140 enters election candidates EC into selected election races. In one embodiment, the game 140 allows election candidates EC to monitor how well (or badly) they are doing in an election race in which they are running. In this embodiment, an election candidate can pass any votes accumulated by that candidate to another election candidate of choice. For example, in a first election race a first election candidate can decide at any time to pass his/her votes to a second election candidate running in the same election race. Once an election candidate transfers their votes to another candidate of their choice the game 140 automatically withdraws that election candidate from that election race. This embodiment is intended to mimic the excitement seen during "Super Tuesday" during U.S. national elections; this embodiment is referred to hereinafter as "Super Tuesday". Alternatively, the first election candidate can decide to drop out of an election race without passing their votes to another election candidate of their choosing. In yet another version of this embodiment and to add further excitement, the game 140 randomly selects a remaining election candidate to receive the votes from the departing election candidate. A flow chart illustrating a non-limiting implementation of this embodiment is shown in FIG. 8.

Figure 8:
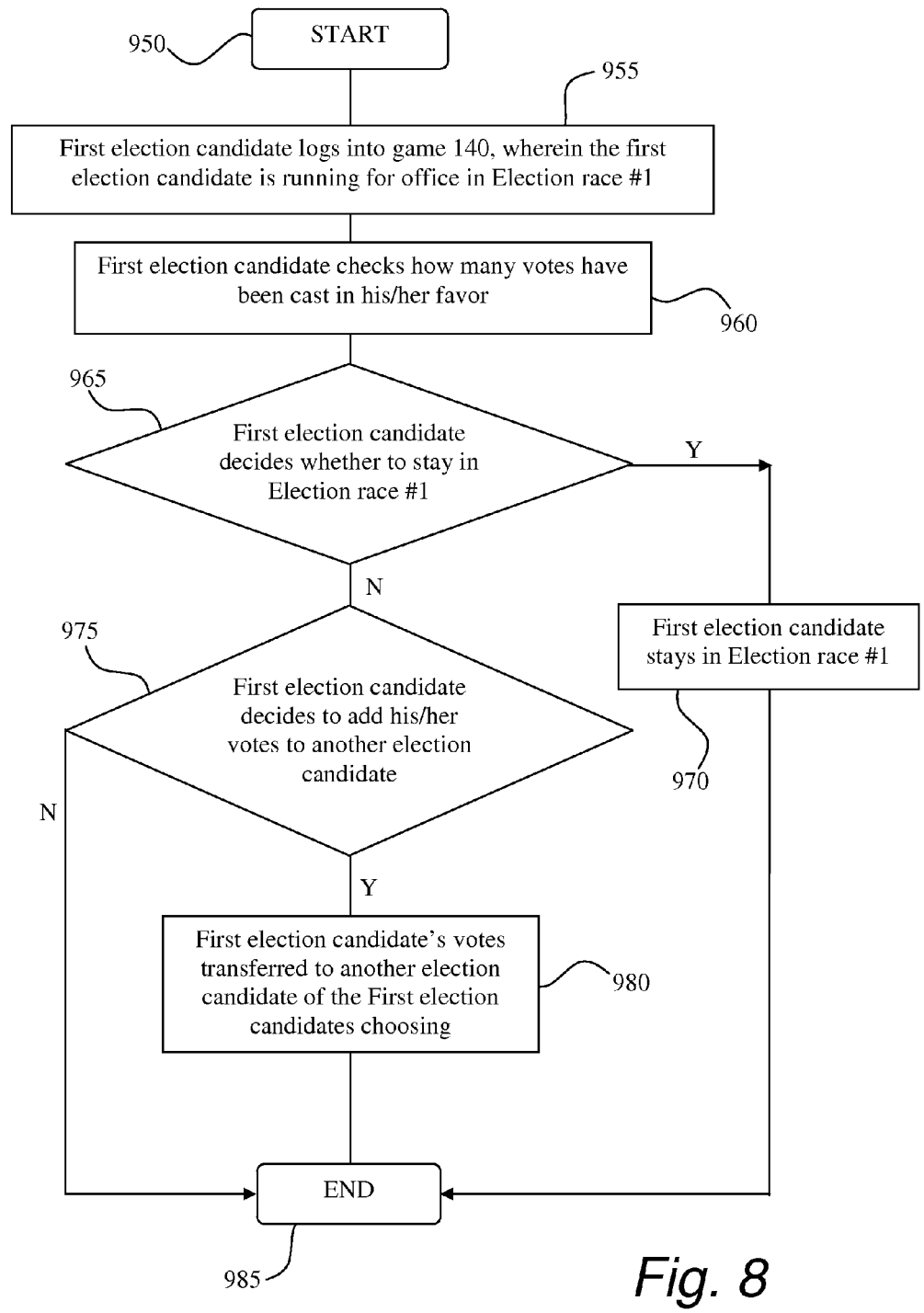
FIG. 8 shows a flowchart according to the present invention.

Referring to FIG. 8 which depicts the "Super Tuesday" embodiment, the embodiment begins at start block 950. At process block 955, a first election candidate logs into game 140, wherein an election candidate (for convenience here referred to as "the first election candidate") is running for office in an election race (for convenience here referred to as "Election race #1"). At block 960 the game 140 permits the first election candidate to check how many votes have been cast in his/her favor in Election Race #1. At determination block 965, a determination is made by the first election candidate as to whether he/she will stay in Election race #1. If the determination at 965 is positive, the election candidate stays in election race #1 as signified by process block 970. If the determination at 965 is negative the first election candidate decides whether to add his/her votes to another election candidate at 975. If the determination at 975 is positive the first election candidate adds his/her votes to another candidate of his/her choice running in the same race at 980, and the embodiment terminates at end block 985. If determination at 975 is negative the embodiment terminates at end block 985.

Election candidates EC, voting participants VP and free floating users FFU can logon to the game 140 and download a summary web page showing who is running in a particular locality such as, but not limited to, the user's neighborhood. For example, a registered user can search for new members corresponding to the registered user's city and/or state along with members running for office in the same city and/or state. New members can be members who joined in the previous 30 days or a period selected by the registered user. A registered user can, for example, search for members currently running for office in their city and/or state and/or members who previously ran for office. Also, the registered user can search for prior election race results for their city and/or state.

Figure 9:
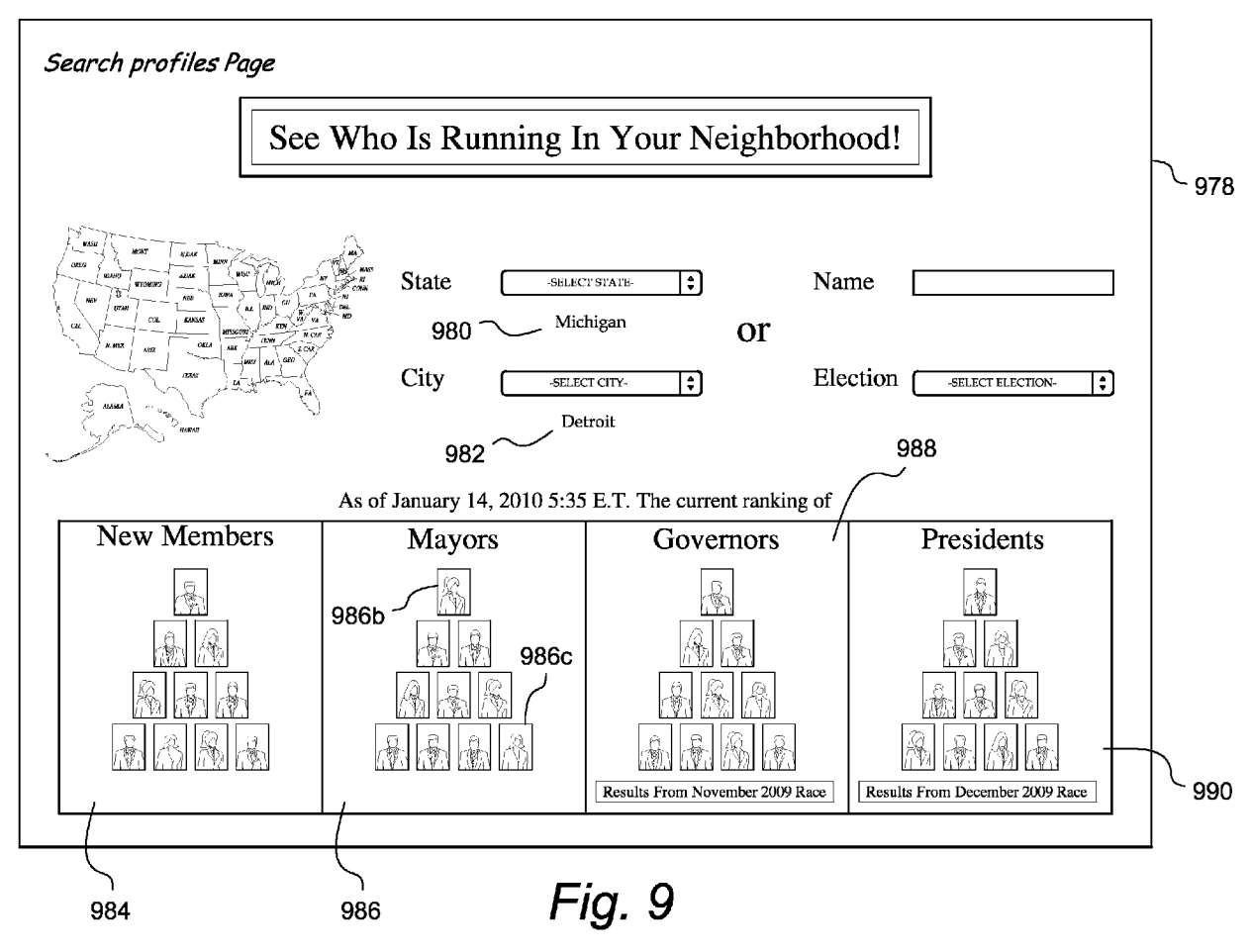
Figure 10:
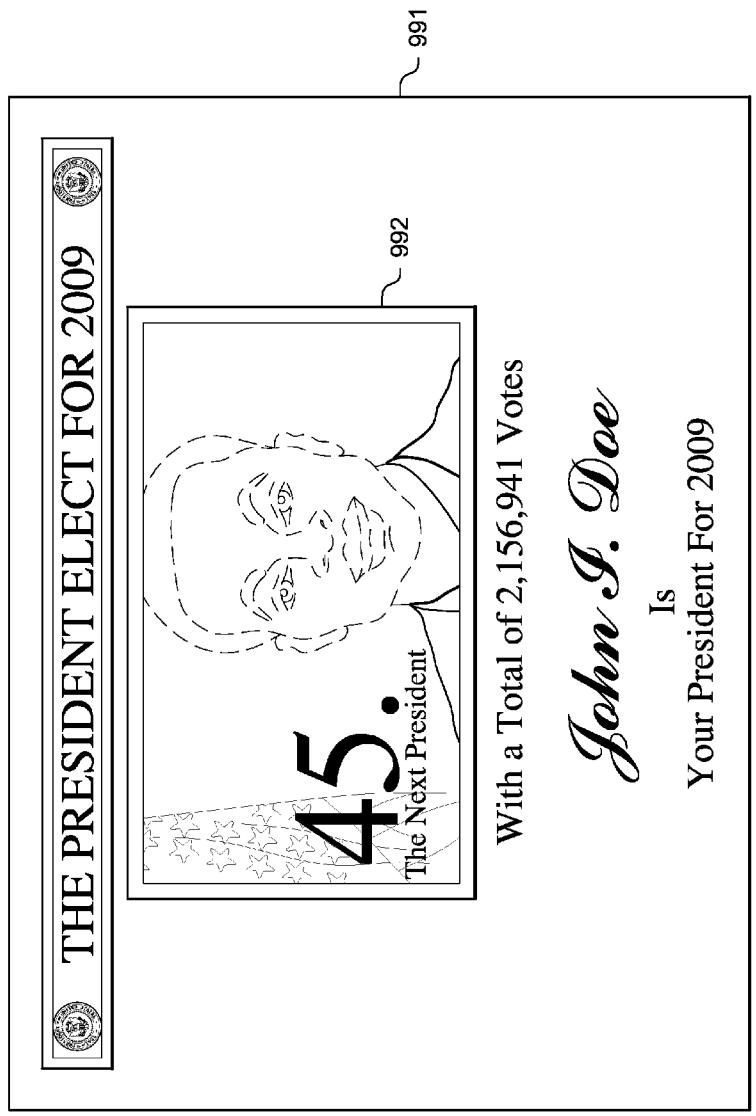
FIG. 10 shows a webpage according to the present invention.

A non-limiting exemplar web page 978 is shown in FIG. 9. A user has selected Michigan at 980 and Detroit at 982. The user has also selected, although not shown, past election results for the November 2009 Race for President of the Year. Upon receipt of these inputs the game 140 displays photographs of: (1) new members associated with Detroit at 984; (2) the results of the election race for Mayor of Detroit at 986, wherein the top ten election candidates are ranked according to the number of votes received for each candidate from top to bottom and left to right in accordance with the number of votes for each candidate such that, for example, the candidate at 986b has the most votes and the candidate shown at 986c the least number of votes with respect to the ten candidates displayed at 986; (3) a ranked display of candidates that run in the fourth quarter race of 2009 for Governorship of the state of Michigan is shown at 988; and (4) a ranked display of candidates that run in the fourth quarter race of 2009 for President is shown at 990. The ultimate goal of the game 140 is to be elected President of the year. FIG. 10 shows a web page 991 depicting a winner 992 of U.S. President of the Year 2010 according to the present invention.

Figure 11:
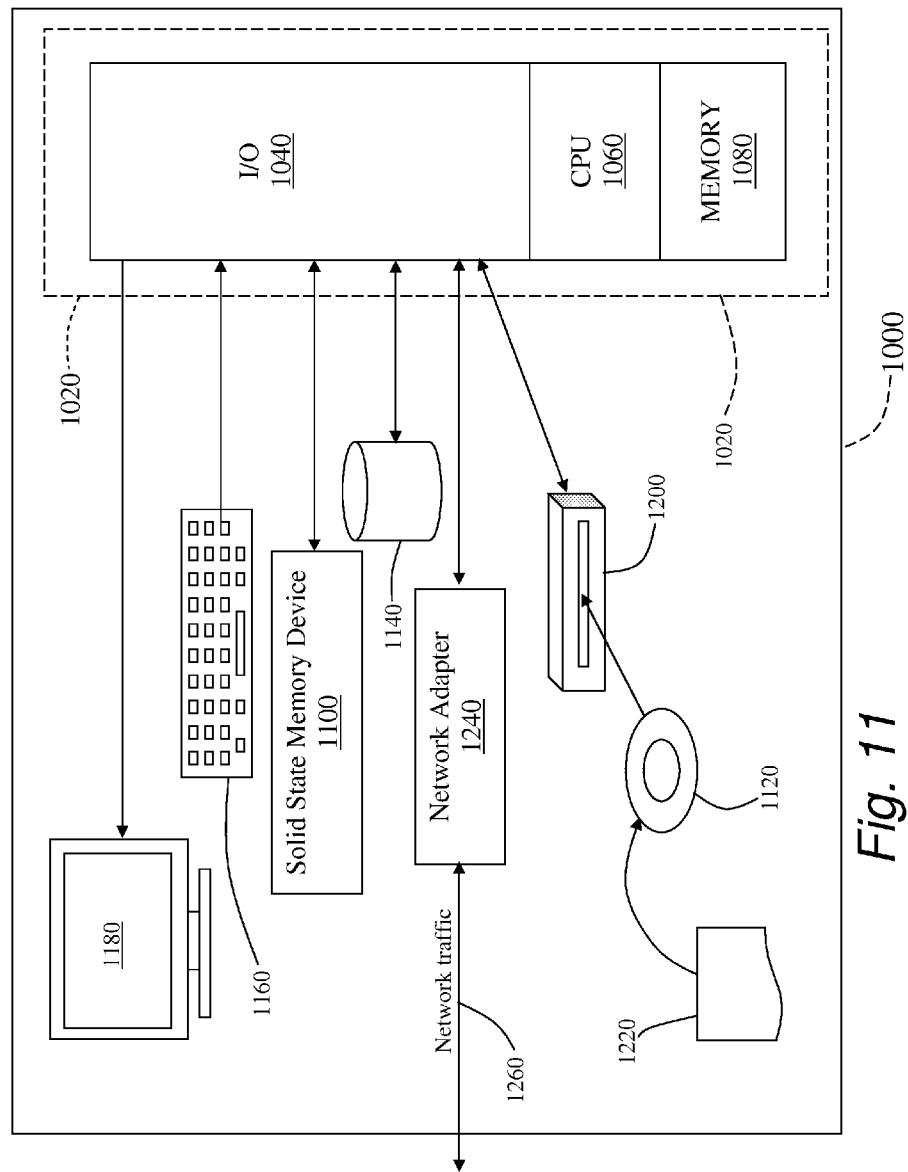
FIG. 11 shows a non-limiting hardware layout according to the present invention.

FIG. 11 depicts an example of a computing system 1000 capable of executing the game 140. In such a system, data and program files may be input to the computing system 1000, which reads the files and executes the programs therein. A control module, illustrated as a processor 1020, is shown having an input/output (I/O) section 1040, at least one microprocessor, or at least one Central Processing Unit (CPU) represented in FIG. 11 by a CPU 1060, and a memory section 1080. The present invention (i.e., game 140) is optionally implemented in software or firmware modules loaded in memory 1080 and/or stored on computer readable media such as, but not limited to: a solid state, non-volatile memory device 1100, a configured ROM disk such as an optically readable disc such as a configured CD/DVD ROM 1120 or a disk storage unit 1140 (e.g., the game 140 can be written to and stored on a solid state, non-volatile memory device 1100, a configured ROM disk such as a configured CD/DVD ROM 1120 or a magnetic medium such as, but not limited to, a floppy disc or hard-drive or a disk storage unit 1140). The computer system 1000 can be a web server running HTPP (hypertext transfer protocol) in either secure or non-secure socket mode to deliver web pages to participants at remote locations on the World Wide Web (WWW also known as the "world-wide-web" or "the web") for implementing the present invention. The term "DVD" refers to optically readable Digital Video Disc; and the term "CD" refers to optical readable Compact Disc. The terms "disc" and "disk" are regarded as equivalent terms.

The I/O section 1040 is connected to a user input module 1160, e.g., a keyboard; an output unit, e.g., a display unit 1180 for displaying the game 140 of the present invention, and one or more program storage devices, such as, without limitation, the solid state, non-volatile memory device 1100, the disk storage unit 1140, and a disk drive unit 1200. The user input module 1160 is shown as a keyboard, but may also be any other type of apparatus for inputting commands into the processor 1020. The solid state, non-volatile memory device 1100 can be an embedded memory device for storing instructions and commands in a form readable by the CPU 1060.

The solid state, non-volatile memory device 1100 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. The disk drive unit 1200 is a CD/DVD-ROM driver unit capable of reading the CD/DVD-ROM medium 1120, which typically contains programs 1220 and data. The program components of the present invention contain the logic steps to effectuate the systems and methods in accordance with the present invention and may reside in the memory section 1080, the solid state, non-volatile memory device 1100, the disk storage unit 1140 or the CD/DVD-ROM medium 1120.

In accordance with an alternative embodiment, the disk drive unit 1200 may be replaced or supplemented by a floppy drive unit, a tape drive unit, or other storage medium drive unit.

A network adapter 1240 is capable of connecting the computing system 1000 to one or more computer systems based in the United States or abroad or a remote computer device via a network link 1260 and thence via, for example, the Internet or a dedicated communication line. Communication between the computing system 1000 and other computer locations can be achieved using hypertext transfer protocol HTTP or HTTPS over a secure socket layer. The network adapter 1240 can be configured to receive and send messages wirelessly or to send/receive messages via a hard line such as a fiber optic cable (e.g., in operation with a cable company such as, but not limited to, COMCAST, COX, or a private network).

Software instructions to perform the present invention can be stored on the solid state, non-volatile memory device 1100, the disk storage unit 1220, or the CD/DVD-ROM 1120 and are executed by the at least one CPU represented in FIG. 11 by CPU 1060. Data may be stored in memory section 1080, or on the solid state, non-volatile memory device 1100, the CD/DVD-ROM 1120, the disk storage unit 1220, the disk drive unit 1200 or other storage medium units operatively coupled to the system 1000.

In accordance with one embodiment, the computing system 1000 further comprises an operating system and usually one or more application programs. The operating system comprises a set of programs that control operations of the computing system 1000 and allocation of resources. The set of programs, inclusive of certain utility programs, may also provide a graphical user interface to the user. An application program is software that runs on top of the operating system software and uses computer resources made available through the operating system to perform application specific tasks desired by the user. In accordance with an embodiment, the operating system employs a graphical user interface wherein the display output of an application program is presented in a rectangular area on the screen of the display device 1180. The operating system can be any suitable operating system, and may be any of the following: Microsoft Corporation's "WINDOWS 95," "WINDOWS CE," "WINDOWS 98," "WINDOWS 2000", "WINDOWS NT", XP, VISTA or "WINDOWS 7" operating systems, IBM's OS/2 WARP, Apple's MACINTOSH SYSTEM 8 operating system, ULTRIX, VAX/VMS, UNIX or LINUX with the X-windows graphical environment, and any suitable operating system under development such as Microsoft's future replacement of the "Window 7" operating system.

In one embodiment of the present invention an educational voting game comprises the steps of:

classifying a plurality of prospective users logged onto an at least one server for user selected preferences, wherein said users are classified into one or more categories including prospective election candidates and prospective voting participants;

verifying that prospective election candidates and voters meet minimum requirements thereby generating a plurality of election candidates and voting participants;

receiving at said at least one server a video clip of predetermined length from each election candidate using the world-wide-web system, wherein each video clip includes personal views on predetermined election issues or in the alternative each video clip includes the election candidates views on why voters should vote for him or her;

receiving at said at least one server photographs from election candidates and voting participants;

receiving at said at least one server a selection for a particular set of virtual clothing from at least one election candidate;

generating avatars for those election candidates unable to provide a video clip and/or a photograph, wherein the election candidates select a set of virtual clothing provided by the education voting game;

allowing voting participants access to the video clips and photographs of the election candidates; and conducting at least one election, wherein voting participants vote for their preferred election candidate on a predetermined election cycle;

wherein election candidates who are elected to office are required to run for a higher office position on the next election cycle.

In a distinct separate embodiment a particular set of rules are used to play the educational voting game.

In a distinct separate embodiment of the present invention a particular set of rules are used to play the educational voting game (hereinafter this distinct and separate embodiment is also referred to as: "If I Were President" or "(I.I.W.P.)"), the rules used in this distinct separate embodiment are:

1. The educational voting game is called: "If I was President";
2. Must be at lease 18 years old to play
3. A candidate must be a citizen of the United States
4. Candidates can only run in the city and state that they register in
5. Any one that wants to vote or run for office must first register to avoid voter fraud
6. A voter can only vote once per candidate per race per city in their state.
7. All Candidates must give their views on each topic
8. Each candidate must have a 1 minute video tell everyone who you are
9. A candidate can not alter their views or their one minute video until that current race is over.
10. All candidates' views on the eight topics and 1 minute video can not promote or demote any political party
11. All elects must choose to run for the next office i.e. Governor or President.
12. A candidate, like all voters gets one vote per candidate per race
13. Before submitting your page all candidates must choose weather or not too use there Super Tuesday vote which is if they are loosing in the race, they can apply all the votes they accrue to some one who is still running, once that vote is made that candidate is drop form the race.
14. If a candidate can not or for any reason decide not to run for the next office he or she forfeits their positions to there runner up.
15. All votes are tallied up on the last day of each month and who ever receive the most votes is elected to the office.
16. All candidates are required to dress in appropriate attire for their picture and 1 minute video
17. When a candidate runs for the presidency all register voters in the fifty states can vote once per that race.
18. If a candidate decides to run for the next office and looses, he or she has to start all over again by running for Mayor.
19. People who live out side the major cities in there state that would like to register to vote or run for office must register with the closes major city because of vote and candidate ratio.
20. During the race for Mayor, Governor, and President of the year race, if there is a tie in votes in user ratio's between any race of the same level (Mayoral or Gubernatorial) within any of the four quarters, a 24 hour run off will take place on the 15th of December to determined who will be in that race.
21. If a user moves to a different location permanently the user must update there registry info at that point, if the user consistently logs on at a different location the game will ask the user after the current race is over to update their profile to reflect their current location to continue to play in the game.

Three paragraphs that can be included in, for example, in promotional literature that can be used to market "If I Were President" (I.I.W.P.) are:

"The object of If I Were President (I.I.W.P.) is to first catch the ears of the people in your city, then state and if possible country, with sound decision on how to fix the problems that ailing this country. Who ever can construct the best way to fix the problems in their city then can move on to fix the problem in the State government and last the Country. Each race the candidate has one shot per quarter to give their best ideas on what they would do if they had the chance at the office. All candidates must careful decide how they plan to fix the eight problems that ail their city, state and country, this eight issues will very per city and per state and can very per quarter. This game is not based on electoral vote or popular votes and is ultimately based on the best way to fix the current condition of our country. The ultimate goal is to construct the best way to fix the problems in the country to win the presidency of the Year.

I.I.W.P. is an online election that gives every American citizen 18 and up a chance to voice their opinion on issues in their city, state and country. How I.I.W.P. works is you register with I.I.W.P. web site, create a profile and submit it, once posted you can choose to run for the office of mayor or just vote for someone in your city, anyone in your city can vote for you. A register voter would log on and see who is running for office in their city or state. The voter would then select a candidate, view their video, and read their ideas on the eight topics, if the voter agrees with that candidate views then they just click the vote button on their page. My invention is novel because it gives a face and a voice to each individual that decides to run for office, were in an actual election for the presidency the individual is represented by a delegate who might not share that voters views, and could vote opposite of that individual for the president and vice president.

The educational voting game 140 is not party based (i.e., there's no GOP (i.e., Republican) or Democratic Party candidates), there are no campaign finance issues. Also, since each voter in the educational voting game 140 is registered there is less scope for voting scams such as phantom votes that would give an advantage to a candidate over another. Each candidate is on their own in these races for Mayor, Governor, and the Presidency; they wouldn't have to report to any party nor would the have any campaign promise to uphold it's simply one person and their ideas. Another feature about this game is that if your ideas do not catch the ears of the people you can always revise your ideas and jump in on the race in the next quarter."

FIG. 12 shows a web page 995 that shows an example of a predetermined election cycle. In this non-limiting example elections are arranged on a quarterly cycle with the mayor elections in the first month of each quarter, the governor elections in the second month of each quarter, and the President election in the third month of each quarter with a President, Mayor and Governor of the whole Year run in the first month of each year, wherein the President, Mayor and Governor of the year is run separately from the first month's election race for Mayor.

It is to be understood that the present invention is not limited to the embodiments described above, but encompasses any and all embodiments within the scope of the attached claims and spirit of the present invention.

What is claimed:
1. An educational voting game comprising the steps of:
classifying a plurality of prospective users logged onto an at least one server for user selected preferences, wherein said users are classified into at least one category including prospective election candidates and prospective voting participants;

verifying that prospective election candidates and voters meet minimum requirements thereby generating a plurality of election candidates and voting participants;

receiving at said at least one server a video clip of predetermined length from each election candidate using the world-wide-web system, wherein each video clip includes personal views on predetermined election issues or in the alternative each video clip includes the election candidates views on why voters should vote for the candidate;

receiving at said at least one server photographs from election candidates and voting participants;

receiving at said at least one server a selection for a particular set of virtual clothing from at least one election candidate;

generating avatars, wherein the avatars are made up of the election candidates photographs and selected virtual clothing;

allowing voting participants access to the video clips and photographs of the election candidates; and conducting at least one election, wherein voting participants vote for their preferred election candidate on a predetermined election cycle;

wherein election candidates who win office are required to run for a higher office position on the next election cycle.

2. The educational voting game according to claim 1, wherein the step of classifying a plurality of prospective users logged onto an at least one server for user selected preferences, wherein said users are classified into at least one category including prospective election candidates, prospective voting participants, and free floating users.

3. The educational voting game according to claim 1, wherein election candidates have the option of transferring their votes to another election candidate of their choice.

4. A computer-readable media having computer-executable instructions thereon that, when executed by a server, perform a method for playing an educational voting game, the method comprising the steps of:

classifying a plurality of prospective users logged onto an at least one server for user selected preferences, wherein said users are classified into at least one category including prospective election candidates and prospective voting participants;

verifying that prospective election candidates and voters meet minimum requirements thereby generating a plurality of election candidates and voting participants;

receiving at said at least one server a video clip of predetermined length from each election candidate using the world-wide-web system, wherein each video clip includes personal views on predetermined election issues or in the alternative each video clip includes the election candidates views on why voters should vote for the candidate;

receiving at said at least one server photographs from election candidates and voting participants;

receiving at said at least one server a selection for a particular set of virtual clothing from at least one election candidate;

generating avatars, wherein the avatars are made up of the election candidates photographs and selected virtual clothing;

allowing voting participants access to the video clips and photographs of the election candidates; and conducting at least one election, wherein voting participants vote for their preferred election candidate on a predetermined election cycle;

wherein election candidates who win office are required to run for a higher office position on the next election cycle.

* * * * *